(12) United States Patent
Celiker et al.

(10) Patent No.: US 9,364,821 B2
(45) Date of Patent: Jun. 14, 2016

(54) PHOTOCATALYTIC NANOCOMPOSITE STRUCTURED WITH BORON

(75) Inventors: Gulsen Celiker, Gebze-Kocaeli (TR);
Huseyin Celiker, Gebze-Kocaeli (TR);
Hilmi Volkan Demir, Ankara (TR)

(73) Assignee: INNOVCOAT NANOCOATINGS AND SURFACE PRODUCTS INDUSTRY, SALES AND R&D INCORPORATION, Gebze-Kocaeli (TR)

( * ) Notice: Subject to any disclaimer, the term of this patent is extended or adjusted under 35 U.S.C. 154(b) by 1106 days.

(21) Appl. No.: 13/379,095

(22) PCT Filed: Jun. 18, 2010

(86) PCT No.: PCT/EP2010/058648
§ 371 (c)(1),
(2), (4) Date: Feb. 15, 2012

(87) PCT Pub. No.: WO2010/146161
PCT Pub. Date: Dec. 23, 2010

(65) Prior Publication Data
US 2012/0190532 A1    Jul. 26, 2012

(51) Int. Cl.
*B01J 31/38*     (2006.01)
*B01J 31/12*     (2006.01)
(Continued)

(52) U.S. Cl.
CPC ............ *B01J 31/123* (2013.01); *B01J 21/02* (2013.01); *B01J 21/063* (2013.01); *B01J 31/0272* (2013.01); *B01J 31/0274* (2013.01); *B01J 31/069* (2013.01); *B01J 35/002* (2013.01); *B01J 35/004* (2013.01); *B01J 35/0013* (2013.01); *B01J 37/0219* (2013.01); *B01J 37/033* (2013.01); *C03C 17/007* (2013.01); *C04B 24/40* (2013.01); *C04B 28/02* (2013.01); *C04B 41/009* (2013.01); *C04B 41/4922* (2013.01); *C04B 41/82* (2013.01); *B01D 2255/20707* (2013.01); *B01D 2255/802* (2013.01); *B01J 21/06* (2013.01); *C03C 2217/445* (2013.01); *C03C 2217/477* (2013.01); *C03C 2217/71* (2013.01); *C03C 2218/113* (2013.01); *C04B 2111/00827* (2013.01); *C04B 2111/2061* (2013.01); *C04B 2111/25* (2013.01)

(58) Field of Classification Search
None
See application file for complete search history.

(56) References Cited

U.S. PATENT DOCUMENTS

| 7,253,226 | B1 * | 8/2007 | Ryang | 524/492 |
| 2005/0191505 | A1 | 9/2005 | Akarsu et al. | 428/469 |
| 2009/0252970 | A1 | 10/2009 | Tamura | 428/428 |

FOREIGN PATENT DOCUMENTS

| CN | 1736583 | 2/2006 |
| EP | 1728819 | 12/2006 |

(Continued)

OTHER PUBLICATIONS

Buckmann et al., "Self-Crosslinking Polymeric Dispersants and Their Use in Emulsion Polymerization," *Int'l Waterborne, High Solids, and Powder Coatings Symposium* 1 (2003).

*Primary Examiner* — Melvin C Mayes
*Assistant Examiner* — Stefanie Cohen
(74) *Attorney, Agent, or Firm* — James C. Lydon

(57) ABSTRACT

This invention is related to a functional inorganic-organic hybrid nanocomposite structured with boron. With the present invention, a nanosized material is obtained with enhanced UV and Visible region activity wherein metal-oxide nanoparticle combinations with boron compounds are used.

6 Claims, 4 Drawing Sheets

(51) Int. Cl.
*B01J 21/02* (2006.01)
*B01J 31/02* (2006.01)
*B01J 31/06* (2006.01)
*B01J 35/00* (2006.01)
*B01J 37/02* (2006.01)
*B01J 37/03* (2006.01)
*C03C 17/00* (2006.01)
*C04B 24/40* (2006.01)
*C04B 28/02* (2006.01)
*C04B 41/00* (2006.01)
*C04B 41/49* (2006.01)
*C04B 41/82* (2006.01)
*B01J 21/06* (2006.01)
*C04B 111/00* (2006.01)
*C04B 111/20* (2006.01)
*C04B 111/25* (2006.01)

(56) References Cited

FOREIGN PATENT DOCUMENTS

| | | |
|---|---|---|
| JP | 9040872 | 2/1997 |
| JP | 2002-210364 | 7/2002 |
| WO | WO 2008/044521 | 4/2008 |

\* cited by examiner

PHOTOCATALYTIC NANOCOMPOSITE STRUCTURED WITH BORON

FIELD OF THE INVENTION

This invention is related to a functional organic-inorganic hybrid nanocomposite structured with boron.

PRIOR ART

In everyday life, the goods that we are using are subjected to contamination because of environmental factors. In order to avoid this contamination, these are either cleaned by cleaning agents or certain additives are added to these goods during their production so as to keep them free of dirt. For keeping goods clean, photocatalytic materials and coatings are used. Titanium dioxide ($TiO_2$) and zinc oxide (ZnO) are photocatalytic materials that are used for this purpose in different applications. $TiO_2$ is a photocatalytic material which exhibits high oxidation characteristics when activated under UV light. With this property, it breaks down the undesired organic dirt particles on the surface.

There are studies done in the state of the art applications which try to increase the photocatalytic productivity of $TiO_2$ and ZnO. In the state of the art applications, $TiO_2$, ZnO and similar different nanoparticles and combination of these nanoparticles are being used. However some of these, because of their photocatalytic effect, in time, are also breaking down the organic coatings they are embedded in. In the UV wavelength region under optical activation, the activity of these materials does not reach a maximum level. Under visible wavelength region, the activity shows a weaker performance. In the literature, we could not find a study using the sol-gel technique to integrate boron compounds together with $TiO_2$ and Zn in order to get a nanocomposite material.

The Chinese patent document CN1736583-A, one of the state of the art applications, discloses a nanooxide synthesis with boron. In this document, boron nanoparticle is placed into the crystal structure (doping). This document does not mention anything about a nanoparticle integrated with boron in a composite structure outside of the crystal structure.

The Japanese patent document JP2002210364-A, one of the state of the art applications, discloses a form of ZnO film with good photocatalytic properties. It is mentioned that ZnO film contains 0.001-20% boron. The said document discloses forming a ZnO containing coating with the wet electrocoating technique. This is not a sol-gel technique.

The Japanese patent document JP9040872-A, one of the state of the art applications, discloses a $TiO_2$ containing composition with photocatalytic activity. There is disclosed an inorganic composition in the document but an organic host material is not mentioned. U.S. Pat. No. 7,253,226-B1 discloses:
   silica sols made by combining at least one hydrolysable silane, at least one organofunctional silane, at least one boron oxide compound, and a liquid, or silica sols made by combining at least one hydrolysable silane, at least one organofunctional silane, at least one acid catalyst, and a liquid to provide an intermediate sol and combining at least one base catalyst with the intermediate sol;
   nanocomposites containing the silica sols and at least one of metal nanoparticle, metal-chalcogenide nanoparticle, metal-oxide nanoparticle, and metal-phosphate nanoparticle;
   and composites containing a polymer material and at least one of the silica sol and the nanocomposite.

In particular, U.S. Pat. No. 7,253,226-B1 discloses in example 27, the preparation of a mixed metal-oxide sol (SiO—TiO). A solution of TEOS and phenyltrimethoxysilane in methoxyethanol is prepared. It is stirred at RT/2 hrs after addition of titanium isopropoxide and boric acid, and then further stirred at RT/overnight and 120° C./3 hrs after addition of DI water. The resulting clear solution is vacuum dried and heat treated at 190° C. in an oven to give colorless residues which are readily soluble in methoxyethanol to give a clear solution.

After combining and mixing suitable amounts of the polymer and the silica sols and/or the nanocomposites containing at least one of the metal nanoparticles, metal-chalcogenide nanoparticles, metal phosphate nanoparticles, and metal-oxide nanoparticles, the mixture is then cured, molded, extruded, formed, or subjected to suitable polymer processing to form a polymer composite having the silica sols and/or the nanocomposites substantially uniformly dispersed therein.

EP 1728819-A2 describes a self-cleaning, oxidative drying paint, showing photocatalytic effect and being water-based, and the production method thereof.

Said Method Basically Comprises the Following Steps:
Partial hydrolysis of silanes (possibly dissolved in solvents) which takes place within at least 24 hours at room temperature; the pH value in the medium is preferably adjusted as maximum 2.0 for the reaction. The silanes used can be selected among silanes carrying hydrolyzed group, methyl triethoxy silane, methyl methoxy silane, tetra methyl ortho silicate, tetraethyl silicate, 3-glycidyloxypropyl trimethoxy silane etc. or non-hydrolyzed silanes, silanes carrying vinyl, metacryloyl, phenyl, fluorine, amino, mercapto etc. group or a mixture thereof in certain proportions Acid catalysts used are preferably strong acids. The proportion of acid catalysts to silanes is maximum 0.5% by weight.
Modifying the surface of nano-sized metal-oxide particles with the obtained hydrolysate: the hydrolyzed silanes are added to the nano-sized anatase type calcined titanium dioxide. The proportion of hydrolysate used to titanium dioxide is between 25-100% by weight. The size of nano-particles can be between 5-25 nm. The process takes place at minimum 100° C.
Dispersing of nano-sized metal-oxides with modified surfaces within water-based and oxidative drying resins.
Mixing the obtained product with certain paint formulations known in the art.

Purposes of the Invention

The invention aims notably to reach at least one of the following purposes.

The purpose of the invention is to develop a new photocatalytic nanocomposite structured with boron with enhanced photocatalytic activities in the UV and visible regions of the spectrum.

Another purpose of the invention is to develop a photocatalytic nanocomposite structured with boron with NOx, COx and SOx breakdown properties converting them into harmless compounds.

Another purpose of the invention is to develop a photocatalytic nanocomposite structured with boron which provides antimicrobial activity.

A further purpose of the invention is to develop a photocatalytic nanocomposite structured with boron with self cleaning and easy cleaning properties.

Another purpose of the invention is to develop a photocatalytic nanocomposite structured with boron containing silicon and/or silane based resin with high scratch and dirt pick-up resistance.

Another purpose of the invention is to develop a photocatalytic nanocomposite structured with boron which makes it possible to obtain thin film coating (e.g. 20-1000 nm thickness).

An additional purpose of the invention is to develop a photocatalytic nanocomposite structured with boron with high water resistance.

A further purpose of the invention is to develop a photocatalytic nanocomposite structured with boron with antifog properties when applied on glassy surfaces.

Another purpose of the invention is to develop a cheap photocatalytic nanocomposite structured with boron with high durability and large scale production possibility.

Another purpose of the invention is to develop a photocatalytic nanocomposite structured with boron with enhanced photocatalytic properties, but on the contrary with less self-breakdown due to its higher durability.

Another purpose of the invention is to develop a photocatalytic nanocomposite structured with boron with enhanced photocatalytic properties and which is in the form of colloidal liquid suspension.

Another purpose of the invention is to develop a photocatalytic nanocomposite structured with boron with enhanced photocatalytic properties and which is in the form of a solid that can be dispersed into a liquid to form a colloidal liquid suspension.

Yet another purpose of the invention is to use a photocatalytic nanocomposite structured with boron with enhanced photocatalytic properties, as active component of improved paint, concrete, mortar, ceramic or coating compositions or as glass-like material.

BRIEF DESCRIPTION OF THE INVENTION

The invention fulfils at least one of these purposes, among others.

In this respect, the invention concerns a boron integrated photocatalytic nanocomposite with an enhanced optical recovery in the UV and visible region, characterized by the process of production with the following steps:
-A- Hydrolysis and Condensation Step:
  Dissolving silanes and metalalkoxides or metalloidalkoxides in alcohol
  Addition of acid,
  Heating,
  Hydrolysis with water and dissolving agent;
-B- Metal Loading Step:
  Addition of organoboron compounds to the hydrolysis mixture,
  Addition of nanosized metal-oxides,
  Heating under agitation;
-C- Resin Addition Step:
  Addition of resin modified with silica and/or silanes,
  Heating the mixture and condensing the resin with the previous mixture.

In another aspect, the invention relates to a process of production of a boron integrated photocatalytic sol-gel nanocomposite with an enhanced optical recovery in the UV and visible region, characterized in that it comprises the following steps -A-, -B- & -C- as above defined.

According to the invention, the boron integrated photocatalytic sol-gel nanocomposite with an enhanced optical recovery in the UV and visible region, can be also defined in that it comprises:
(a) Clusters of particles, each being composed of:
  (a.1) nanoparticles of at least one metaloxide;
  (a.2) particles, preferably nanoparticles (a.2.1), of boron oxide and/or of boron and/or of antimony oxide and/or of antimony,
    and, possibly, particles, preferably nanoparticles (a.2.2), of at least one metalloidoxide different from boron and from antimony;
  (a.3) and a network made of (i) organosiloxane(s) and/or (ii) silane(s)/silica and/or (iii) condensation products of silane(s) and metalalkoxides and/or metalloidalkoxides and/or alcohols;
    said network (a.3) encapsulating the (nano)-particles (a.2.1) in such way that the possible hydrophilic character of (nano)particles (a.2.1) is confined inside the clusters and does not express outside;
    said network (a.3) including —O— bridges [optionally —C— bonds] between the nanoparticles (a.1), the (nano)-particles (a.2.1) of boron oxide and/or of boron and/or of antimony oxide and/or of antimony, and possibly the particles, preferably nanoparticles (a.2.2), of at least one metalloidoxide different from boron and from antimony;
(b) at least one resin, preferably a resin chemically modified to impart notably water resistance and rubbing fastness to the resin (b), and, more preferably, a resin (b) chemically modified by silane(s), siloxane(s) and/or silane(s) coupling agents; said resin (b) being at least partially linked to particles (a) notably via —O— bridges and/or —C— bonds;
(c) and possibly a liquid phase, (wherein a part of the resin (b) is possibly dissolved), said liquid phase being preferably water based.

This sol-gel nanocomposite is characterized:
by a photocatalytic activity given by a test T1 measuring the optical cleaning (OC) of a standard surface coated with the sol-gel nanocomposite, after exposure to different UV $\lambda$, such as: for $\lambda \geq 380$ nm, OC$\geq$30%, preferably OC$\geq$35%, and more preferably 70%$\geq$OC$\geq$40%;
and/or by a surface morphology obtained after dip coating onto a standard surface according to standard protocol P1, and observed by Atomic Force Microscopy (AFM) according to a protocol P2, such as the coating has at least one of the following features ($s_1$), ($s_2$), ($s_3$):
  ($s_1$) the surface comprises a mean number of discrete peaks per $\mu m^2$ between 5-65, preferably 15-55, and, more preferably 25-40,
  ($s_2$) the height of these peaks being between 5 and 100 nm, preferably 10 and 60 nm, and, more preferably 15 and 50 nm,
  ($s_3$) and the base diameter of these peaks being between 30 and 500 nm, preferably 50 and 350 nm, and, more preferably 70 and 250 nm.

The photocatalytic nanocomposite according to the invention is structured with boron and has a high water resistance due to its silica coating.

In another aspect, the invention relates to a paint composition characterized in that it contains the sol-gel nanocomposite according to the invention.

In another aspect, the invention relates to a concrete composition characterized in that it contains the sol-gel nanocomposite according to the invention.

In another aspect, the invention relates to a mortar composition characterized in that it contains the sol-gel nanocomposite according to the invention.

In another aspect, the invention relates to a ceramic composition (e.g. for the manufacture of tiles) characterized in that it contains the sol-gel nanocomposite according to the invention.

In another aspect, the invention relates to a coating composition for polymer films characterized in that it contains the sol-gel nanocomposite according to the invention.

In another aspect, the invention relates to a coating composition for metallic, glass or ceramic substrates, characterized in that it contains the sol-gel nanocomposite according to the invention.

In another aspect, the invention relates to a glass-like material characterized in that it is made of the sol-gel nanocomposite according to the invention.

DEFINITIONS

Any singular in this text shall correspond to a plural and reciprocally.

"Me" means methyle

"Et" means ethyle

According to the present invention, "Hydrophilic character" means for instance that the contact angle measured is less than 90°, highly hydrophilic surfaces are having contact angle between 0° and 30°.

According to the present invention, "Hydrophobic character" means for instance that the contact angle measured is equal to or higher than 90°.

According to the present invention, "Nanoparticles" means for instance at least one of its dimensions is equal or less than 20 nm, preferably equal or less than 10 nm in powder form.

Test T1: Optical Recovery Measurements:

Methylene blue is used for contaminating surfaces and results of recovery observed after exposure to UV radiation.

Equipment used:

Xenon Light Source: ASB-XE-175

Monochromator: Spectral Products—CM110 ⅛ m

Power meter: Newport—Multifunctional Optical Meter (Model 1835-C)

Detector & Calibration Module: Newport—818-UV

Labview Program used for controlling monochromator to set wavelength and gather data from power meter.

Methylene blue: % 0.04 solution

Protocol:

- Activate xenon light source, wait until it heats up and reaches steady state.
- Using Monochoromator via Labview, Scan the corresponding microampere ($\mu A$) for 300 nm-800 nm wavelength interval. (No samples attached to detector) (to determine energy for each wavelength and use it to calculate activation times for samples)
- Using glass cutter, Cut samples (coated glasses) in to 1.7 cm×1.7 cm squares.
- Attach a non-coated glass to detector and measure $\mu A$ value for visible spectra (390 nm-750 nm). (to be a future reference for transparency comparison of samples)

The following part is repeated for each sample:
- Attach sample to detector, scan visible spectra (390 nm-750 nm) (This will be the "clean" data);
- Take off the sample, apply Methylene blue on it (approximately 3 milliliters is enough to cover surface.);
- Wait for surface to be contaminated. (5 minutes)(Do not expose sample to light during contamination.);
- Get the excessive amount of Methylene blue from surface;
- Attach sample back to detector;
- Scan sample visible spectra (390 nm-750 nm) (This will be the "contaminated" data);
- Using MATLAB code, calculate needed activation time for desired activation length by using initial power measurement;
- Activate the surface in UV (i.e. 300 nm);
- Scan sample visible spectra (390 nm-750 nm)(This will be the "recovered" data);
- By using "clean", "contaminated" and "recovered" data calculate % cleaning.

Take off samples, shut down system.

Protocol P1

Dip Coating Application

Equipment used: KSV DX 2S-500

Method:

At room temperature, the substrate, which is a glass microscope slide, is immersed into the coating solution consisting in the boron integrated photocatalytic nanocomposite according to the invention (for instance prepared as described in example 1, 2 or 3). The coating solution is contained in a circular container chosen such as the length of the slide is less or equal to one-third of the diameter of the container. The speed of immersion (dipping) is 10-100 nm/min. As soon as the slide is totally immersed into the coating solution, said slide is pulled out of the container with the same speed, without waiting in immersed position. When the lamella is out of the container, it is kept in vertical position for 10 minutes to have necessary drainage and evaporation.

Protocol P2

AFM Measurements:

AFM measurements are conducted as both contact and non-contact mode due to fact that AFM measurement results differ regarding the hardness of the material. Films formed differ in hardness according to their substances.

For contact mode: Contact mode tip ContactAl-6 which has resonant frequency of 13 kHz and force constant 02. N/m used for scanning.

For non-contact mode: Non-contact mode tip TOP300Al-6 which has resonant frequency of 300 kHz and force constant of 0.3N/m used for scanning. Protocol:

- AFM is set to its initial position, tip mounted on it.
- Laser of the AFM set on the tip to be able to make the measurement.
- Tip is approached to sample
- Only for non-contact mode: Before getting close to surface frequency is set to appropriate value to obtain as sharp images as possible.
- Data is gathered in both directions to confirm structure is observed well enough.
- Data's processed in XEI to get 3D images.

DETAILED EXPLANATION OF THE INVENTION

Description of the Enclosed Figures

The Boron Integrated Photocatalytic Nanocomposite

Figure 1:
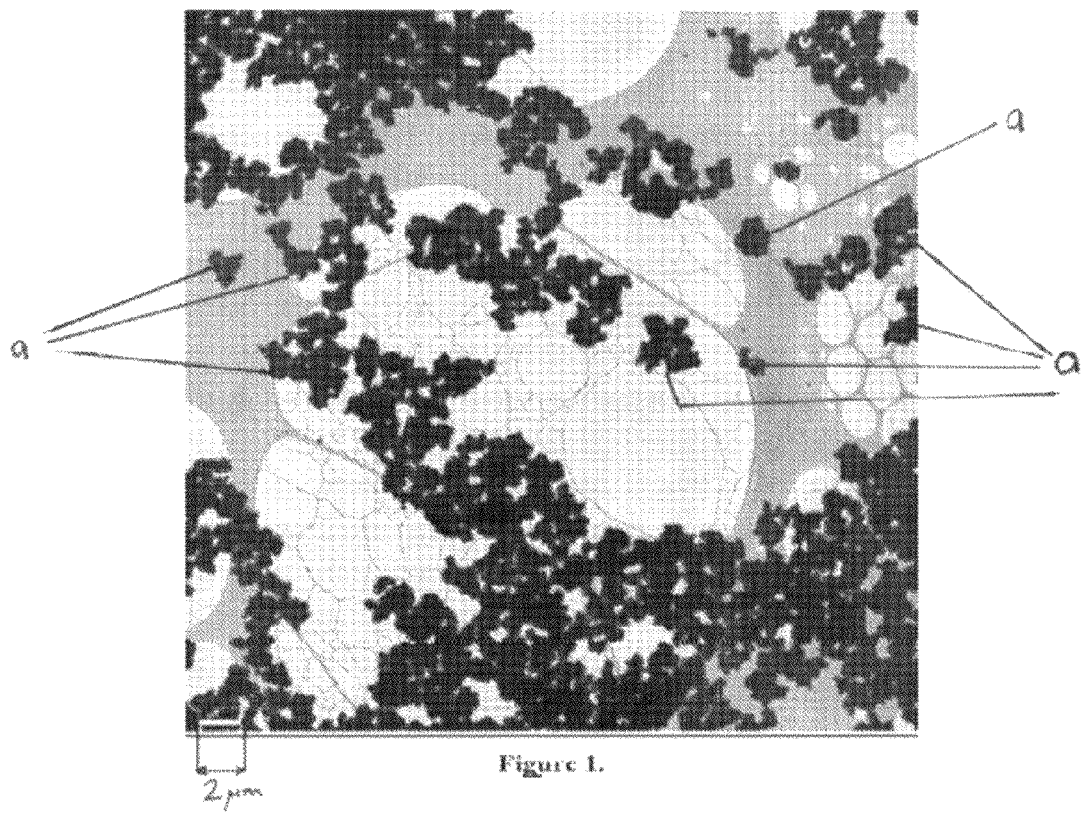
FIGS. 1 and 2 represent pictures obtained by Electronic Microscopy (Magnifying Power, respectively $5\times10^3$ and $11\times10^6$) of a sol-gel nanocomposite according to the invention as prepared in the Example 3 hereinafter.

There are at least two ways to define the new nanocomposite according to the invention: the product-by-process way and the structural way.

Product-by process

Step -A-

The compounds dissolved in the alcohol during the hydrolysis and condensation step -A- are advantageously one or more of the following:
(i) silanes: alkylalkoxysilane, fluoroalkoxysilane, organofunctional silane, aminofunctional silane, preferably tetraalkoxysilanes, and more preferably tetramethoxysilanes, tetraethoxysilanes,
(ii) and/or semiconducting metal containing metalalkoxyoxides or metalloidalkoxides, (e.g. boron, titanium, zirconium) preferably trialkylborates, and more preferably trimethyl-borates, triethylborates.

The alcohol is preferably R—OH, wherein R corresponds e.g. to C1-C10 alkyle, preferably C1-C3 alkyle, and R—OH being more preferably EtOH.

The compound dissolved in alcohol are advantageously $Si(OMe)_4$, $Si(OEt)_4$ and $(Me)_3BO_3$.

Preferably, the acid added during the hydrolysis and condensation step -A- is hydrochloric acid or boric acid, or hydrochloric acid and boric acid.

In fact, the pH is for example less or equal to 3, preferably 2. So, the acid or the combination of acids is chosen quantitavely and qualitatively therefore.

As an example of the compounds and the concentrations used in step -A-, there are for 2 M of $Si(OEt)_4$, for instance 0.5-3.5 M, preferably 1-3 M, more preferably 2 M of $Si(OMe)_4$, 0.5-3.5 M, preferably 1-3 M, more preferably 2 M of $(Me)_3BO_3$, 0.25-2 M, preferably 0.5-1.5 M, more preferably 1 M of alcohol (e.g. EtOH), 0.001-0.5 M, preferably 0.01-0.1 M, more preferably 0.04 M of a strong acid (e.g. HCl), and 0.01-1.5 M, preferably 0.1-1 M, more preferably 0.3 M of $H_3BO_3$.

Preferably, the heating during the hydrolysis and condensation step -A- is at a temperature comprised between 50 and 100° C., preferably between 60 and 90° C. or between 75 and 85° C.

It is advisable according to the invention that the hydrolysis with water and dissolving agent, during the hydrolysis and condensation step -A-, endures from at least 3 hours, preferably 4 to 15 hours or 4 to 8 hours.

Step -B-

In a preferred embodiment, during the metal loading step -B-:
the organoboron added is boron oxide,
and the nanosized metal-oxides is $TiO_2$ (preferably 2-50 nm size anatase type $TiO_2$) and possibly at least another metal-oxide chosen within the group comprising zinc oxide, aluminium oxide, thallium oxide, zirconium oxide and mixes thereof.

In this variant with nanosized ZnO, a nanocomposite material $TiO_2$-boron-ZnO is obtained.

According to an advantageous embodiment, silica, preferably fumed silica, is added to the organoboron and the nanosized metal-oxides, during the metal loading step -B-.

Preferably, the nanosized $TiO_2$ added during the metal loading step -B- is of an anatase type $TiO_2$ of a size comprised between 2 and 50 nm.

According to a remarkable feature of the invention, the heating during agitation of the metal loading step -B- occurs for at least 0.5 h, preferably for 1 h-5 h, or for 2 h at a maximum temperature of 100° C., preferably of 90° C. or of 85° C.

Step -C-

The resin (b) is preferably silane, siloxane or silane coupling agent modified resin. It could be for example the commercial product Ultrabond P287® manufactured and sold by the Chemical village corporation. It is an aqueous emulsion copolymer of styrene and acrylic ester. The polymer has been silane modified to impart very high water resistance and rubbing fastness. This polymer has been specially designed for manufacturing paint and coating.

Other examples of suitable resins (b) are Setaque® 6801, Setalux® 2117 from Nuplex® resins According to a preferred feature of the invention, the resin (b) is a thermosetting resin.

Preferably, the condensation (thermosetting) of the resin (b) during the resin addition step -C- occurs at a maximum temperature of 80° C., preferably of 60° C. or of 40° C. The condensation (thermosetting) time of the resin is at least of several minutes, preferably 0.5-3 hours, more preferably 1 hour±0.1, under agitation.

Improvingly, the resin is bonded to the nanocomposite matrix with covalent bonds. Actually, at least a part of the resin is linked to the shell (a.2) of the clusters of particles (a). At least another part of the resin is dispersed or dissolved in the liquid continuous phase (c) (if present) of the boron integrated nanocomposite.

In a preferred embodiment, the boron integrated nanocomposite comprises the particles (a), the resin (b) and the liquid continuous phase (c).

Structural Definition of the Nanocomposite

Figure 2:
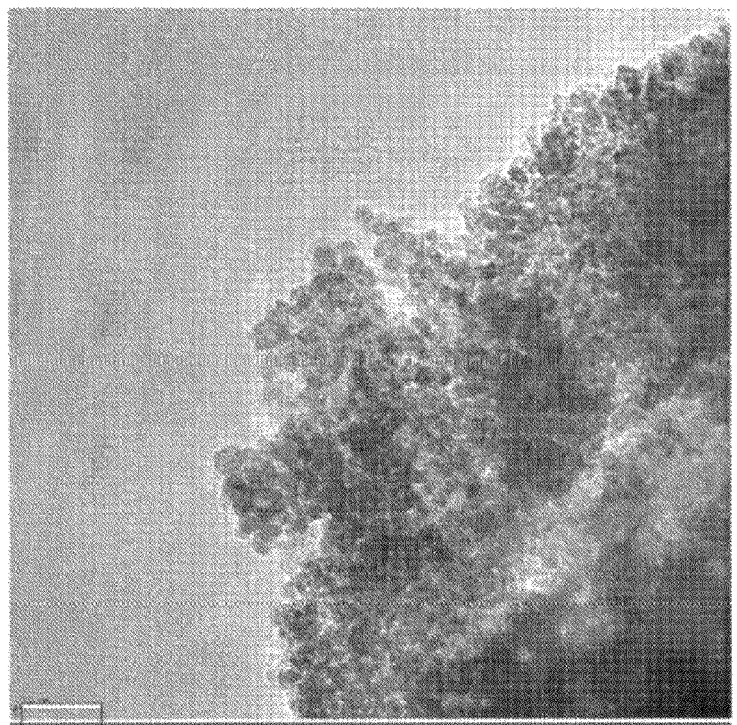

The boron integrated photocatalytic sol-gel nanocomposite with an enhanced optical recovery in the UV and visible region, can be also defined by its physico-chemical structure (-a-) (-b-) (-c-) such as described supra and shown on FIGS. 1 and 2:
(a) Clusters of:
  (a.1) (nano)particles (e.g. $TiO_2$);
  (a.2)
    (a.2.1) (nano)particles (e.g. B and/or Sb and/or their oxides)
    (a.2.2) possible (nano)particles (e.g. $SiO_2$);
  (a.3) Network (lattice) of organosiloxane(s) (i) and/or silane(s)/silica (ii) and/or condensation products (iii) of silane(s) and metalalkoxides or metalloidalkoxides and/or alcohols;
(b) resin;
(c) and possibly a liquid phase.

In particular, FIG. 1 shows several clusters (a) of the nanoparticles (a.1), (a.2.1), possibly (a.2.2), and the —Si—O— network (a.3); and to which the resin (b) is at least partially linked. FIG. 2 shows a detail of a cluster (a) of FIG. 1.

The possible liquid phase (c) could correspond to the non-black parts of the picture of FIG. 1.

The nanocomposite according to the invention can be in solid form or in liquid form.

The solid form can be: powder, or coating onto the surface of a substrate.

The liquid form corresponds to a colloidal suspension of clusters (a) linked to resin (b).

Thanks to its specific structure wherein (nano)particles (a.1)—e.g. $TiO_2$-, (nano)particles (a.2.1)—e.g. B and/or Sb and/or their oxides-, and possibly (nano)particles (a.2.2)—e.g. $SiO_2$—, are embedded in a three-dimensional network (-a-)(-b-), the nanocomposite of the invention has notably the following functionalities: photocatalysis, biocid, high water-resistance (hydrophobia), anti-stain, easy-clean, anti-graffiti, anti-fog.

Thus, the boron integrated nanocomposite according to the invention, can be used as coating or film which can be bonded to various substrates, providing to these latter the above-mentioned functionalities and moreover, having high and long stability/durability, high scratch, dirty pick-up and rub resistance.

The metaloxide of the (nano)particles (a.1) is preferably selected from: zinc oxide, aluminium oxide, thallium oxide, zirconium oxide, titanium dioxide and mixes thereof. Titanium dioxide is preferred as (nano)particles (a.1).

The boron oxide can be for instance $B_2O_3$, $B_2O$, $B_6O$.

The antimony oxide can be for instance $Sb_2O_3$, $Sb_3O_6$, $Sb_2SiO$, $HgSb_4O_8$, preferably $Sb_2O_3$.

The metalloid of the metalloidoxides in the preferable (nano)particles (a.2.2) is preferably Si.

The metals of the metalalkoxides of the lattice (a.3) are preferably selected from: Ti, Tl, Zn, Zr, Al and mixes thereof.

The metalloids of the metalloidalkoxides of the lattice (a.3) are preferably selected from: Si, B, Sb and mixes thereof.

The alcohols of the lattice (a.3) are preferably alcohols of formula R—OH, wherein R corresponds e.g. to C1-C10 alkyle, preferably C1-C3 alkyle, and R—OH being more preferably EtOH.

The resin (c) can be linked to the clusters (a) of particles notably via —O— bridges and/or —C— bonds. It means that the reactions which give rise to these bonds are respectively hydroly-sis/condensation and addition on double bonds, for instance.

Surface Morphology:

The sol-gel nanocomposite according to the invention can also be defined through a surface morphology obtained after dip coating (Protocol P1) of the photocatalytic nanocomposite structured with boron and obtained in the Example 3 hereinafter described onto a standard surface, and observed by Atomic Force Microscopy (AFM) according to Protocol P2.

Figure 3:
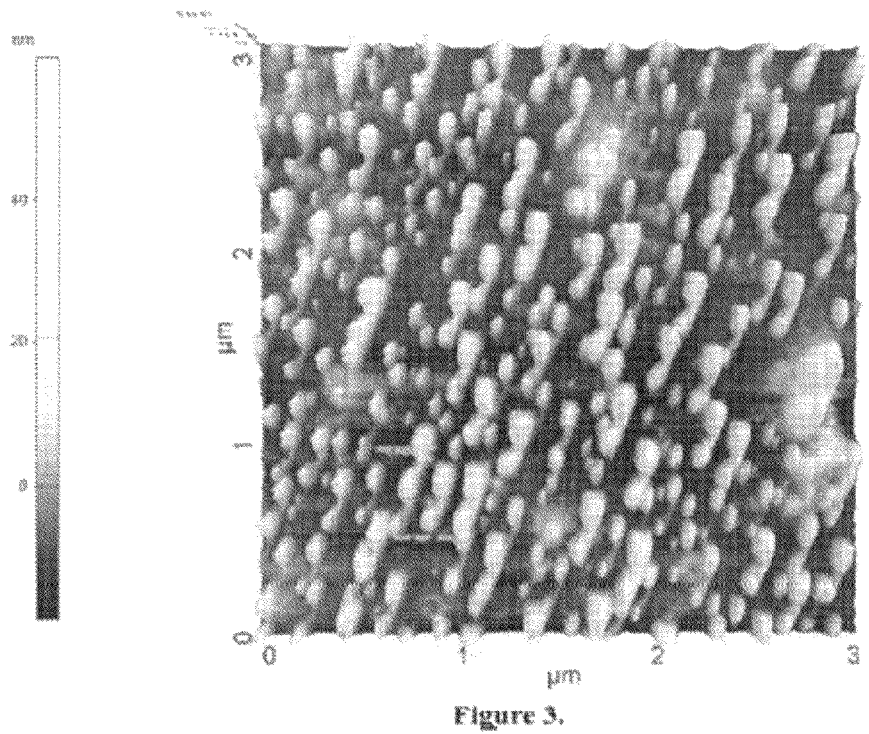
FIG. 3 is a AFM view from above picture (Protocol P2) showing the surface morphology of the boron structured coating obtained after dip coating (Protocol P1) from the sol-gel nanocomposite according to the invention as prepared in the Example 3 hereinafter.
Figure 4:
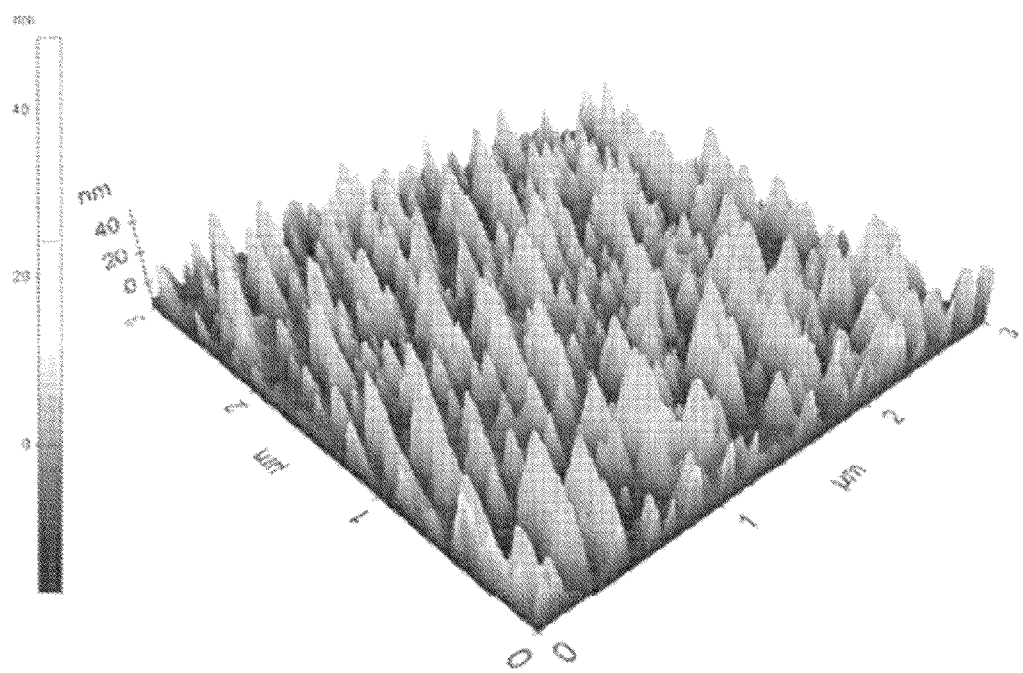
FIG. 4 is a three-quarter front view of FIG. 3.

As it appears from FIGS. 3 and 4, the coating obtained from the boron integrated nanocomposite according to the invention, made of numerous peaks side by side from the substrate (glass microscope slide).

This coating morphology has at least one of features $(S_1)$, $(s_2)$, $(s_3)$ as above defined:
   $(s_1)$ mean number of discrete peaks
   $(s_2)$ height of these peaks
   $(s_3)$ base diameter of these peaks.

The determination of these features can be done for a part or for the whole surface of the coated glass microscope slide.

For instance, a partial surface unit of 9 µm² as obtained on the AFM pictures of FIGS. 3 and 4, can be considered.

The counting for $(s_1)$ determination can then be done along 2 axis of the 9 µm² surface unit of FIGS. 3 and 4. For example, the 2 median perpendicular axis (X,X) and (Y,Y) (see FIGS. 3 and 4).

Referring to FIG. 3, 18 peaks can be counted on the axis (X,X) and 17 peaks on the axis (Y,Y).

So, the mean number/µm² $(s_1)$=(17×18)/9=34 peaks/µm².

The measurement of $(s_2)$ is done on the FIG. 4, with the help of the graduated scale. Actually, the heights of the peaks of FIG. 4 are comprised between circa 10 nm and circa 50 nm.

Concerning the base diameter $(s_3)$ of the peaks, it appears on FIG. 3 that $(s_3)$ is comprised between circa 3 mm and circa 6 mm, which corresponds to circa 92 nm to circa 184 nm (scale: 1 mm=30.66 nm).

The invention has a unique advantageous morphological structure owing to the synergetic effect of boron and titanium dioxide. The surface structure is shown at nanometric scale in FIG. 3 and FIG. 4 with which wetting of the substrate surface by oil or water is prevented effectively due to extended peaks from the surface.

Figure 6:
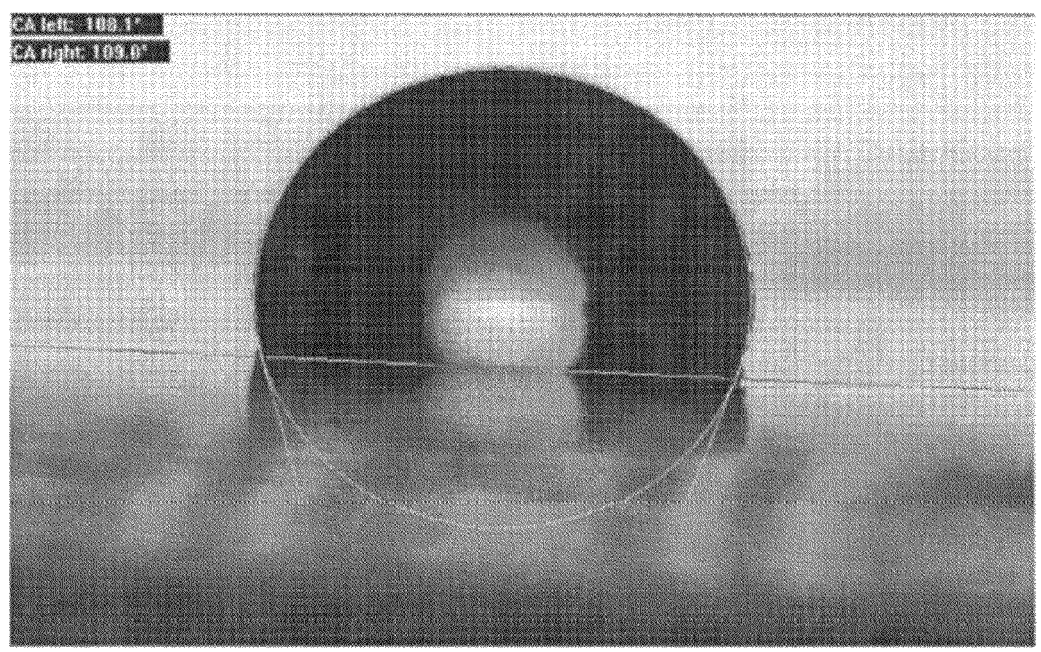
FIG. 6 is a picture of the measurement of the contact angle done on the coating of FIGS. 3 and 4.

Water Resistance:

FIG. 6 shows the improved water repelling effect of the surface coated with the sol-gel nanocomposite according to the invention, where the contact angles are increased although the intrinsic nature of both titanium dioxide and boron are hydrophilic. Encapsulation of titanium dioxide and boron with silica and its uniform distribution with nanometric scale roughness brings hydrophobic behaviour. Contact angle with water is measured as 108°.1 on the left and 109°.0 on the right. This property gives an easy-clean functionality.

For oil and dirt repellency flourine and wax containing additives are generally used. These additives are subject to release from the surface and have limited life time. However boron structured titanium dioxide nanocomposite exhibits a stable long term oleophobicity together with hydrophobicity.

After keeping at 40° C. in water for two weeks, oleophobic and hydrophobic characteristics of the coated surface of the glass microscope slide of FIGS. 3, 4 do not show any change. This is verified with XPS and AFM measurements.

Figure 7:
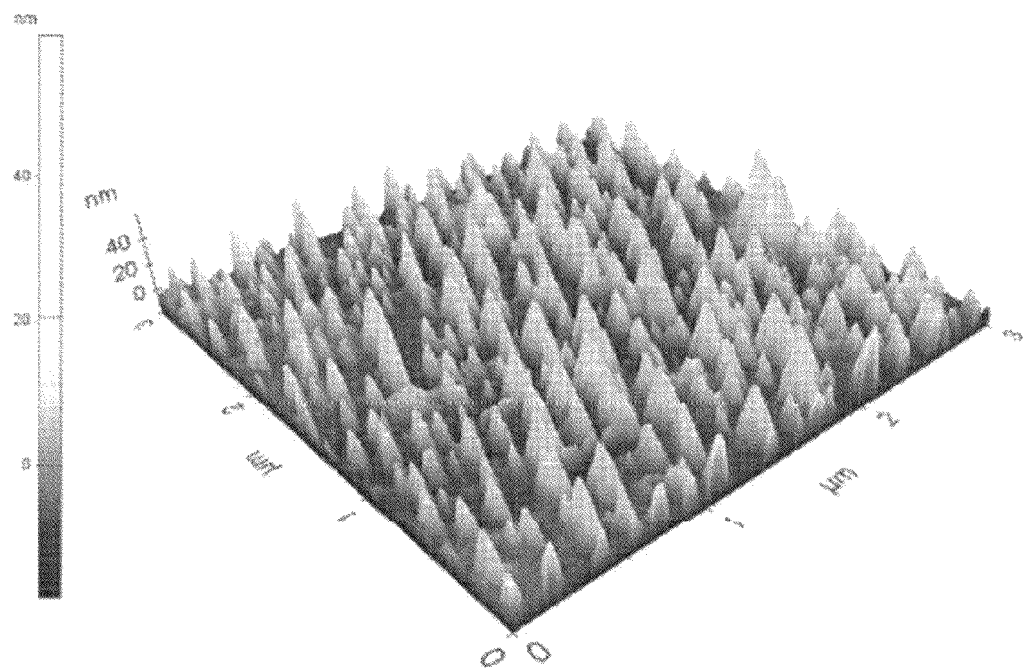
FIG. 7 is a picture of the coated surface of FIGS. 3 and 4 after the scratch measurement test.

Scratch Resistance:

Scratch measurement test is done by sticking Scotch Brite® under steel with 800 gr weight and 4 cm² area. After 10 cycles application on the surface, AFM picture is taken. FIG. 7 shows this picture of the coated surface of FIGS. 3 and 4 after the scratch measurement test. It can be seen that the number of peaks has not decreased too much (s1)=20 peaks/µm².

Thus, the coating made with the sol-gel nanocomposite of the invention has high scratch resistance.

Photocatalytic Activity:

The sol-gel nanocomposite according to the invention has a photocatalytic activity given by a test T1 measuring the optical cleaning (OC) of a standard surface coated with the solgel nanocomposite, after exposure to different UV λ, such as: for λ≤380 nm, OC≥30%, preferably OC≥35%, and more preferably 70%≥OC≥40%.

Figure 5:
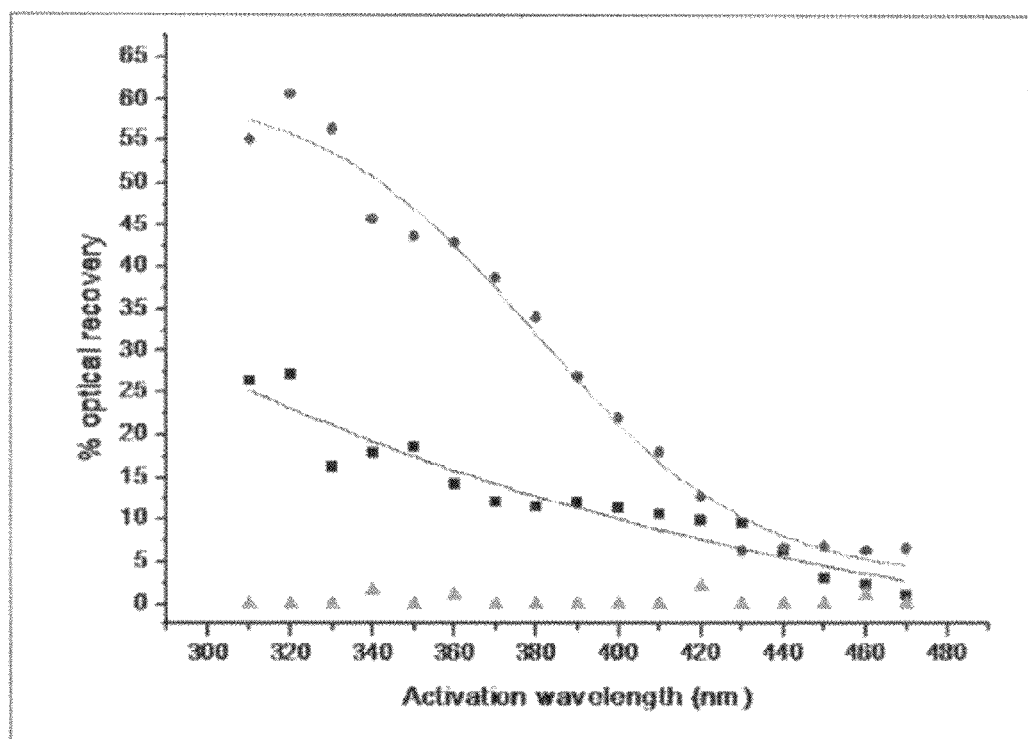
FIG. 5 is a graph of the percentage of optical recovery according to the activation wave lengths (nm) of films prepared respectively from:
- ■ a comparative composition including only $TiO_2$ particles,
- ● a $TiO_2/B$ nanocomposite composition according to the invention,
- ▲ a control composition with no nanoparticle.
  (see Example 4)

The "photocatalytic nanocomposite structured with boron" according to the invention is illustrated in the accompanying figures:

FIG. 5 shows the photocatalytic activity (OC) of comparative optical recovery percentages of samples of:
   1. sol-gel with no nanoparticles (negative control group),
   2. sol-gel containing $TiO_2$ nanoparticles,
   3. and sol-gel containing $TiO_2$ nanoparticles structured with boron, as a function of the activation wavelength.
      OC is measured according to T1.

This FIG. 5 shows the optical recovery of the three samples as a function of the activation wavelength.

The samples are prepared according to the Example 4 hereinafter described.

According to the results, samples of the negative control group sol-gel with no nanoparticles have no self-cleaning properties. Optical recovery percentage of the said samples as a function of activation wavelength is zero. When $TiO_2$ nanoparticles are added to the sol-gel, self cleaning is observed below 380 nm wavelength and reached 25% self cleaning at 310 nm. In addition, according to the experimental results, the self cleaning performance of the nanocomposite material which is composed of sol-gel integrated with boron and titanium dioxide, is increasing at different wavelengths (e.g. UV-Vis), this increase reaches up to 60% at certain wavelengths, and the self cleaning performance of the composite could be twice as much compared to the results with no boron incorporation (FIG. 5). As a result, the nano material obtained by $TiO_2$-boron compounds showing photocatalytic effect provides high and effective cleaning performance in the visible and UV wavelengths.

Process

This process according to the invention, for the production of a boron integrated photocatalytic sol-gel nanocomposite, can comprise all or part of the features defined above in respect to the nanocomposite.

Applications

The inventive photocatalytic nanocomposite structured with boron enables air polluting gases such as NOx, COx and SOx to be converted into harmless compounds. Also, the said material has antibacterial, antimicrobial, self cleaning and easy-clean properties together with low dirt pickup and low scratch properties due to silicon, boron and silica resin. The inventive nano material obtained with solgel method can be used as thick coatings with other materials or can be used on its own yielding film thicknesses less than 1 micron. Having been coated with silica, the product has good water repellence properties and has antifog properties when applied on glassy surfaces. The photocatalytic nanocomposite structured with boron is more inexpensive compared to use of metal-oxides produced by doping method, and it can be produced in large quantities and is more durable.

Nano materials containing no boron compounds have limited activation under UV light. Some of these nanoparticles, in time, are break down the coating in which they are embedded. During production of the said nano material, nanometaloxide material integrated with boron is covalently bonded in the composite structure and this increases the abrasion resistance of the coating preventing breakdown of material and loss of mass in time.

Metal atoms are distributed in a disordered manner but homogeneously in the photocatalytic nanocomposite structured with boron whereby enhancing the photocatalytic effect. The inventive photocatalytic nanocomposite structured with boron has good application in the health sector where high hygienic conditions are required. Owing to its easy-clean, self cleaning, antimicrobial and antibacterial properties, the invention has wide applications in hospitals, public use areas, food processing sites, protection of important products, environment, security etc. The inventive nanocomposite can be applied as a coating in the form of a thin film on its own or can be applied within other materials. Besides, it can be used in glass production due to its antifog properties. Photocatalytic nanocomposite structured with boron, also converts air polluting gases such as SOx, NOx and COx to harmless compounds when applied on exterior and interior surfaces in the construction sector, interior and exterior painting and in all kinds of coatings. Also, it can be used in places like closed parking lots where sunlight is not available, under the light emitted from the light sources.

The nanocomposite according to the invention can be used together with different materials in the form of thick films or of thick films of minimum 10 µm, preferably of minimum 20 µm, and, more preferably of 50 to 10.000 µm.

Said nanocomposite can also be used as a sole film of maximum 1 micron or of thickness less than 10 µm, preferably less than 5 µm.

Film making or coating with the nanocomposite according to the invention, presupposes that said Boron integrated nanocomposite is preferably liquid (abc) and is applied on a substrate through conventional methods brushing, spraying, spin coating, rolling, wiping among others.

The film-making or -coating process can include an activation of the hardening (curing) of the film or the coating, for instance a thermal activation e.g. at a temperature greater or equal to 20° C., preferably comprised between 30-60° C.

Preferably, said nanocomposite is used in the health, food, environment and safety sectors because of its easy clean, self cleaning, antimicrobial and antibacterial properties.

In an application, among others, of the invention, said nanocomposite is used in the glass production because of its antifog properties.

Coating compositions containing the nanocomposite according to the invention can be applied on different substrates, for instance:

glass
ceramics (tiles)
concrete, mortar
metal
polymer

These coatings or films on glass, ceramic, concrete or mortar substrates of buildings have notably anti-graffiti properties.

When applied onto metallic substrates (steel, aluminium), these coatings or films provide anti-stain and easy-clean properties. These latter are particularly interesting for metals used for the manufacture of household appliances of elevators, of exterior walls (frontages) of buildings.

The sol-gel nanocomposite according to the invention can also be a paint or a (transparent) varnish.

In another application, said nanocomposite is used in the construction and painting sectors in the form of coating because of their cleaning effect on NOx, SOx and COx.

This nanocomposite can be used as exterior or interior photocatalytic wall paint by adding extenders such as calcites and resins and siloxanes if needed. In another application, said nanocomposite is used in closed spaces with no sunlight where the photocatalytic effect could be obtained by different light sources.

EXAMPLES

Example 1

Preparation of a Boron Integrated Nanocomposite According to the Invention

Step -A-

Mixture A: 2 moles of Dynasylan A, $C_8H_{20}O_4Si$ (tetraethoxysilane, CAS no 78-10-4), Dynasylan M, $C_4H_{20}O_4Si$ (tetramethoxysilane, CAS no 681-84-5) and Kemira grade trimethylborate $C_3H_9BO_3$ (CAS no 121-43-7), 99.8% purity mixture is loaded into glass reaction vessel under mixing. After, homogenization of the mixture 1 mole of ethyl alcohol is added to the vessel). Following that, 0.04 moles of HCl in water is added to the reactor together with 0.3 moles of boric acid in ethyl alcohol, 99.5%, $C_2H_8O$, CAS no 64-17-5. Preferably boric acid is dispersed in alcohol with ultrasonic dispersion. Temperature of the vessel is adjusted to 75-85° C. and kept at this temperature, minimum 4 hours. Ethyl alcohol reflux is provided.

Step -B-

Mixture B: 10 moles of 6 nanometer sized anatase titanium dioxide PC500 (Millenium Inorganic Chemicals), preferably 0.5 moles of nanosized boron oxide, 0.5 moles of Aerosil 200 (Degussa, Evonik) added to the glass reactor and this mixture is dispersed in 90 moles of water.

Step -C-

Mixture A is added on Mixture B under agitation and the temperature is increased up to 85° C. and a gentle agitation is done for 2 hours. 1480 g of pure acrylic emulsion (preferably silane modified) is added to the reactor and mixed for 1 hour at 40° C.

Example 2

Mixture A is prepared as in Example 1. Mixture B is prepared with 6 moles of anatase $TiO_2$ (PC500-Crystal) or <10 nm Hombicat UV100 (from Sachleben), 0.5 moles of nanosized Boron Oxide from American Elements (20-80 nm size), 1 mole of Kemira grade Zinc Borate and 60 moles of water.

Mixture A is added on Mixture B under agitation and the reaction is carried out at 80° C. for 3.5 hours. 1.25 kg of emulsion polymer (DL420G from Dow) is added to the vessel and treated with the nanocomposite matrix for 90 minutes at 50° C. This nanocomposite can be used as (i) an exterior masonry coating with photocatalytic and fire retardant properties by adding the other necessary ingredients, (ii) and interior mat, or semi mat or satin gloss or glossy wall coating with photocatalytic fire retardant and antimicrobial properties by adding the other necessary ingredients.

Example 3

Thin Film Coating

6:4:0.8:0.5 molar ratio of Dynasilan A (tetraethoxysilane Degussa-Evonik), Dynasilan M (tetramethoxysilane from Degussa-Evonik), Dynasilan F8261 (triethoxy(3,3,4,4,5,5,6,6,7,7,8,8,8-tridecafluorooctyl)-silane from Degussa-Evonik) and Dynasilan VTMO (Vinyltrimethoxysilane from Degussa-Evonik), 1.2 moles of Kemira Grade Trimethylborate are mixed and reacted with 0.4% H2SO4 (% 37), 0.8% Boric Acid and 0.5% Acetic Acid in 1:1 ratio of Ethyl Alcohol (% 99) and Ethyl Acetate solution at 75° C. for 1½ hours. 1.9 moles of $TiO_2$ (PC500-Crystal) is added and reaction continued for 2 hours at 85° C. and cooled down to 60° C. 598 gr of self-crosslinking acrylic dispersion Setaqua 6771 from Nuplex resins can also be added to the mixture at 45° C. and reacted for 1 hour with the nanocomposite and then cooled down.

Example 4

Thin Film Coating Application

This nanocomposite formulated as in example 3 can be applied 24 hours after the reaction is completed in the reactor and cooled down.

Glass panels with the size of 2 cm width and 7 cm length are washed with 1% sodium silicate solution and rinsed it off using demineralized water to remove grease and contaminants on the surface. Nanocomposite is poured into a glass vessel of 200 cc. After mixing for 5 minutes with the magnetic stirrer, glass vessel is placed under the dip coating apparatus. Dipping is done with 43 mm/min speed. As soon as the slide is totally immersed into the coating solution, said slide is pulled out of the container with 43 mm/min, without waiting in immersed position. When the glass panel is out of the vessel, it is kept in vertical position for 10 minutes to have necessary drainage and evaporation. Coated glass panels are treated with thermal curing at 100° C. for 15 minutes. AFM, optical recovery, wetting angle, scratch resistance measurements can be done after keeping panels at room temperature for another 24 hours.

The results of AFM are shown on FIGS. 3 and 4.

The results of the measurement of the photocatalytic activity through the optical recovery, are shown on FIG. 5.

The results of the measurement of the wetting angle are shown on FIG. 6.

The results of the scratch resistance are shown on FIG. 7.

The invention claimed is:

1. A boron integrated photocatalytic sol-gel nanocomposite having an enhanced optical recovery in the UV and visible region, comprising:
   (a) clusters of particles, each being composed of:
      (a.1) nanoparticles of at least one metaloxide;
      (a.2) particles (a.2.1), selected from the group consisting of boron, antimony, boron oxide, antimony oxide and mixtures thereof,
         and, optionally, particles (a.2.2), of at least one metalloidoxide different from boron and from antimony;
      (a.3) and a network (a.3) made of (i) organosiloxane(s) and/or (ii) silane(s)/silica and/or (iii) condensation products of silane(s) and metalalkoxides and/or metalloidalkoxides and/or alcohols;
         said network (a.3) encapsulating the particles (a.2.1) in such way that the possible hydrophilic character of particles (a.2.1) is confined inside the clusters and does not express outside;
         said network (a.3) including —O— bridges and optionally —C— bonds between the nanoparticles (a.1), said particles (a.2.1), and optionally the particles (a.2.2), of at least one metalloidoxide different from boron and from antimony;
   (b) at least one resin; said resin (b) being at least partially linked to particles (a) via —O— bridges and/or —C— bonds, and is covalently bonded to said network (a.3);
   (c) and optionally a liquid phase, wherein a part of the resin (b) is optionally dissolved,
   said nanocomposite having a surface morphology obtained after dip coating onto a standard surface according to standard protocol P1, and observed by Atomic Force Microscopy (AFM) according to a protocol P2, such that the coating has at least one of the following features (s1), (s2), (s3):
      (s1) the surface comprises a mean number of discrete peaks per $\mu m^2$ between 5-65,
      (s2) the height of these peaks is between 5 and 100 nm,
      (s3) and the base diameter of these peaks is between 30 and 500 nm.

2. The sol-gel nanocomposite of claim 1, having a photocatalytic activity obtained by a test T1 measuring the optical cleaning (OC) of a standard surface coated with the sol-gel nanocomposite, after exposure to different UV $\lambda$, wherein for $\lambda \leq 380$ nm, OC$\geq$30%.

3. A paint composition comprising the sol-gel nanocomposite of claim 1.

4. A concrete composition comprising the sol-gel nanocomposite of claim 1.

5. A mortar composition comprising the sol-gel nanocomposite of claim 1.

6. A ceramic composition comprising the sol-gel nanocomposite of claim 1.

* * * * *